United States Patent
Kokawaji et al.

(10) Patent No.: US 11,833,412 B2
(45) Date of Patent: Dec. 5, 2023

(54) OPERATION DEVICE AND OPERATION SYSTEM

(71) Applicant: SINTOKOGIO, LTD., Nagoya (JP)

(72) Inventors: Takahiro Kokawaji, Nagoya (JP); Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 0 days.

(21) Appl. No.: 18/060,658

(22) Filed: Dec. 1, 2022

(65) Prior Publication Data

US 2023/0201710 A1 Jun. 29, 2023

(30) Foreign Application Priority Data

Dec. 23, 2021 (JP) .................. 2021-209755

(51) Int. Cl.
| | | |
|---|---|---|
| *A63F 13/21* | (2014.01) | |
| *G01L 5/16* | (2020.01) | |
| *G06F 3/0338* | (2013.01) | |
| *G06F 3/02* | (2006.01) | |
| *A63F 13/24* | (2014.01) | |

(52) U.S. Cl.
CPC .............. *A63F 13/21* (2014.09); *A63F 13/24* (2014.09); *G01L 5/16* (2013.01); *G06F 3/02* (2013.01); *G06F 3/0338* (2013.01)

(58) Field of Classification Search
CPC . A63F 13/21; A63F 13/24; G01L 5/16; G06F 3/02; G06F 3/0338
See application file for complete search history.

(56) References Cited

U.S. PATENT DOCUMENTS

| | | | | |
|---|---|---|---|---|
| 2011/0107850 A1* | 5/2011 | Kim | .................. | G01L 5/163 |
| | | | | 73/862.041 |
| 2015/0276514 A1* | 10/2015 | Shibata | ................. | G01L 5/0028 |
| | | | | 73/862.045 |
| 2019/0209919 A1 | 7/2019 | Nakagawa et al. | | |
| 2021/0178254 A1 | 6/2021 | Nakagawa et al. | | |
| 2021/0311565 A1* | 10/2021 | Stack | ................... | G06F 3/0338 |

FOREIGN PATENT DOCUMENTS

| | | |
|---|---|---|
| JP | 2012-252378 A | 12/2012 |
| JP | 2017-195062 A | 10/2017 |
| WO | WO-2018/020794 A1 | 2/2018 |

* cited by examiner

*Primary Examiner* — Lunyi Lao
*Assistant Examiner* — Kebede T Teshome
(74) *Attorney, Agent, or Firm* — Harness, Dickey & Pierce, P.L.C.

(57) ABSTRACT

Realized is a technology which allows more various operations with respect to an operation target. An operation device includes: at least one six-axis force-moment sensor; and a button. The at least one six-axis force-moment sensor can detect a force in a direction of a first axis which intersects a first main surface of a housing, a moment about the first axis, a force in a direction of a second axis which is along the first main surface, a moment about the second axis, a force in a direction of a third axis which is along the first main surface and which intersects the second axis, and a moment about the third axis. The button can detect at least the force in the direction of the first axis and the moments about the second and third axes, and is provided to the first main surface.

6 Claims, 9 Drawing Sheets

OPERATION DEVICE AND OPERATION SYSTEM

This Nonprovisional application claims priority under 35 U.S.C. § 119 on Patent Application No. 2021-209755 filed in Japan on 23 Dec., 2021, the entire contents of which are hereby incorporated by reference.

TECHNICAL FIELD

The present invention relates to an operation device and an operation system.

BACKGROUND ART

Patent Literature 1 discloses an input device including: a multi-axis force sensor which detects each of the direction and the strength of a force applied by an operator; and an operation part which is capable of being operated in any direction. The input device disclosed in Patent Literature 1 allows an improvement in operation feeling, by including a spiral spring via which the operation part and the multi-axis force sensor are connected.

CITATION LIST

Patent Literature

[Patent Literature 1]
Japanese Patent Application Publication Tokukai No. 2012-252378

SUMMARY OF INVENTION

Technical Problem

However, the input device disclosed in Patent Literature 1 is configured such that the operation part, which is curved, can be operated in the directions of a total of three axes, i.e., rightward and leftward (X axis) directions, forward and backward (Y axis) directions, and upward and downward (Z axis) directions, with respect to a surface of a main body of a game machine and such that the directions and the strengths of forces which are applied by the operator and which are translated in the directions of the three axes (X axis, Y axis, and Z axis) are detected by the multi-axis force sensor.

Therefore, since the directions of forces which directions can be detected by the multi-axis force sensor are limited to the directions of the three axes in which directions the forces are translated, the input device disclosed in Patent Literature 1 is not sufficient in terms of the variety of operations conducted with respect to an operation target.

The object of an aspect of the present invention is to provide an operation device which allows more various operations to be conducted with respect to an operation target.

Solution to Problem

In order to attain the above object, an operation device in accordance with an aspect of the present invention includes: at least one six-axis force-moment sensor; and a button, the at least one six-axis force-moment sensor being capable of detecting (i) a force in a direction of a first axis which intersects a first main surface of a housing, (ii) a moment about the first axis, (iii) a force in a direction of a second axis which is along the first main surface of the housing, (iv) a moment about the second axis, (v) a force in a direction of a third axis which is along the first main surface of the housing and which intersects the second axis, and (vi) a moment about the third axis, the button being capable of detecting at least the force in the direction of the first axis, the moment about the second axis, and the moment about the third axis, and being provided to the first main surface of the housing.

Advantageous Effects of Invention

According to an aspect of the present invention, it is possible to realize a technology which allows more various operations to be conducted with respect to an operation target.

DESCRIPTION OF EMBODIMENTS

Figure 1:
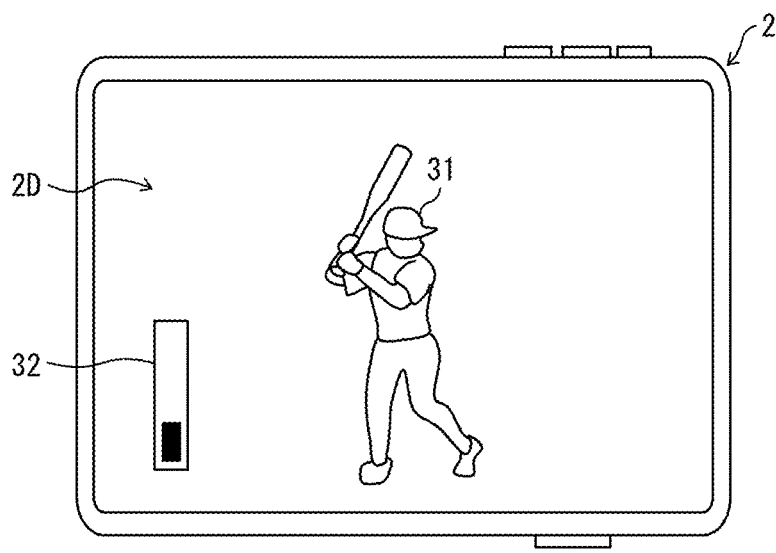
FIG. 1 is a drawing for explaining an example of an operation target.
Figure 2:
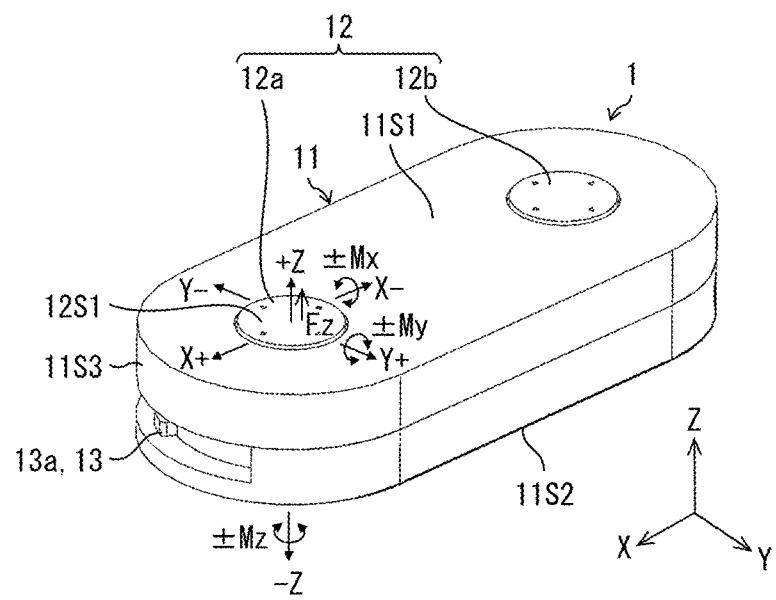
FIG. 2 is a drawing schematically illustrating the appearance of an operation device in accordance with an embodiment of the present invention.
Figure 3:
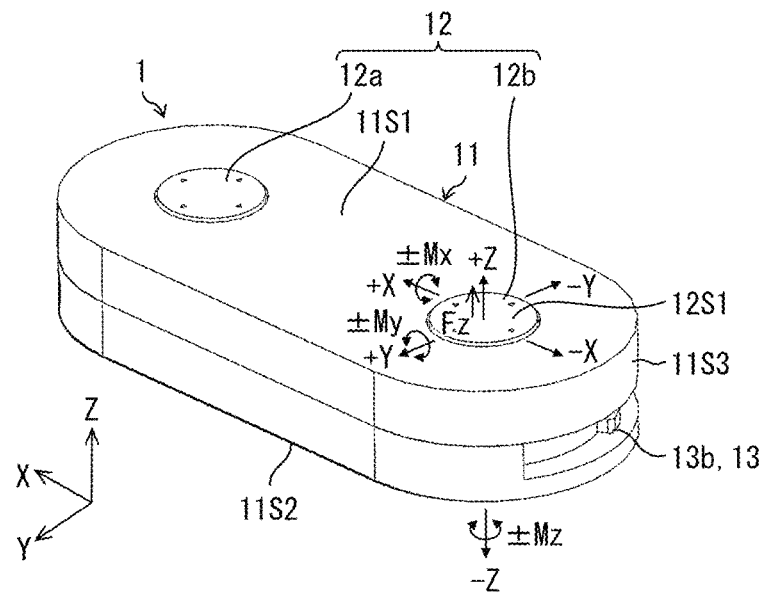
FIG. 3 is a drawing schematically illustrating the appearance of the operation device in accordance with an embodiment of the present invention.
Figure 4:
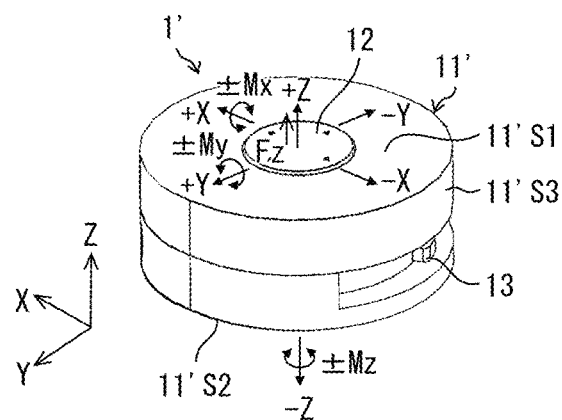
FIG. 4 is a drawing schematically illustrating the appearance of an operation device in accordance with an embodiment of the present invention.

The following description will discuss an operation device 1 in accordance with an embodiment of the present invention with reference to FIGS. 1 to 8. FIG. 1 is a drawing which is for explaining an example of an operation target 2 and which schematically illustrates the appearance of the operation target 2. FIG. 2 is a drawing schematically illustrating the appearance of an operation device 1 in accordance with an embodiment of the present invention, as viewed from a button 12a side. FIG. 3 is a drawing schematically illustrating the appearance of the operation device 1, as viewed from a button 12b side. FIG. 4 is a drawing schematically illustrating the appearance of an operation device 1' in accordance with another embodiment of the present invention.

The operation target 2 can be, for example, a multicopter or a device, such as a personal computer, a tablet personal computer, or a smartphone, which can be used as a conventionally known game machine such as a mobile game device or a video game device.

On a display screen 2D included in the operation target 2, a motion control target, e.g., a character 31 in this case, the motion of which is controlled by the operation device 1, 1' is depicted. On the display screen 2D, a motion control target assisting part, e.g., a power gauge 32, which makes a motion in cooperation with the character 31 may be depicted.

The operation device 1 is a means with use of which a user operates any operation target 2. As illustrated in FIGS. 2 and 3, the operation device 1 includes two buttons 12a and 12b which are provided to a first main surface 11S1 of a housing 11 and two levers 13a and 13b which are provided to a side surface 11S3 of the housing 11. Inside the housing 11 of the operation device 1, two six-axis force-moment sensors (see a six-axis force-moment sensor 14 illustrated in FIG. 5) are provided. Note that another main surface of the housing 11 is referred to as a second main surface 11S2.

Figure 5:
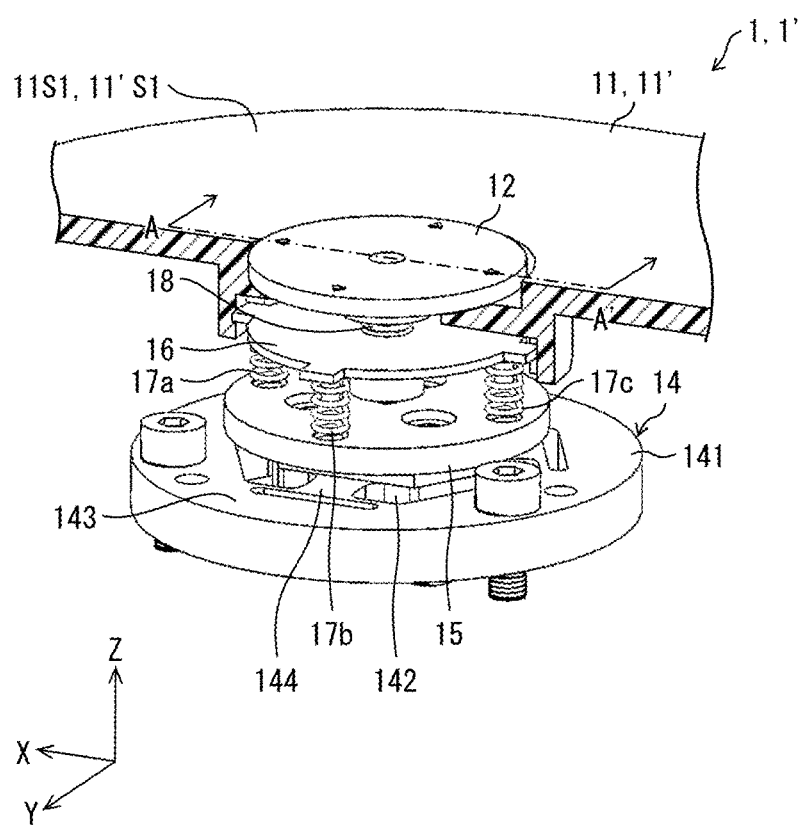
FIG. 5 is a partial cross-sectional view illustrating a structure in which a button and a strain element that are included in the operation device are coupled to each other.

The button 12a and the lever 13a are coupled to one of the two six-axis force-moment sensors (see the six-axis force-moment sensor 14 illustrated in FIG. 5). The button 12b and the lever 13b are coupled to the other of the two six-axis force-moment sensors (see the six-axis force-moment sensor 14 illustrated in FIG. 5).

The operation device 1 detects, by the one of the two six-axis force-moment sensors (see the six-axis force-moment sensor 14 illustrated in FIG. 5), the direction and the strength of a force or a moment received by the button 12a and the lever 13a, and outputs, by, for example, analog-digital (AD) conversion, a signal which varies depending on a detected value.

Similarly, the operation device 1 detects, by the other of the two six-axis force-moment sensors (see the six-axis force-moment sensor 14 illustrated in FIG. 5), the direction and the strength of a force or a moment received by the button 12b and the lever 13b, and outputs, by, for example, AD conversion, a signal which varies depending on a detected value.

Note that, in the following description, the two six-axis force-moment sensors included in the operation device 1 may be referred to as six-axis force-moment sensors 14a and 14b for distinction or may be each simply referred to as a six-axis force-moment sensor 14 without distinction. The same applies to the buttons 12a and 12b and the levers 13a and 13b. That is, the buttons 12a and 12b may be each simply referred to as a button 12, and the levers 13a and 13b may be each simply referred to as a lever 13.

As illustrated in FIG. 4, the operation device 1' includes a single button 12 which is provided to a first main surface 11'S1 of a housing 11' and a single lever 13 which is provided to a side surface 11'S3 of the housing 11'. Inside the housing 11' of the operation device 1', a single six-axis force-moment sensor (see the six-axis force-moment sensor 14 illustrated in FIG. 5) is provided. The button 12 and the lever 13 are coupled to the six-axis force-moment sensor (see the six-axis force-moment sensor 14 illustrated in FIG. 5). Note that another main surface of the housing 11' is referred to as a second main surface 11'S2.

A configuration of each part included in the operation device 1, 1' will be described below. FIG. 5 is a partial cross-sectional view illustrating a structure in which the button 12, which is included in the operation device 1, 1', and a strain element 141 included in the six-axis force-moment sensor 14, which is included in the operation device 1, 1', are coupled to each other.

The six-axis force-moment sensor 14 includes the strain element 141. The strain element 141 is disposed such that two main surfaces thereof are parallel to the first main surface 11S1, 11'S1 of the housing 11, 11' of the operation device 1, 1'. Therefore, the six-axis force-moment sensor 14 is capable of detecting a force ($F_Z$, $F_X$, $F_Y$) in the direction of each axis of the housing 11, 11' of the operation device 1, 1' and a moment ($M_Z$, $M_X$, $M_Y$) about each axis of the housing 11, 11' of the operation device 1, 1'.

Note that, to be precise, the strain element 141 included in the six-axis force-moment sensor 14 is capable of detecting a force F ($F_Z$, $F_X$, $F_Y$) in the direction of each axis of the housing 11, 11' of the operation device 1, 1' and a moment ($M_Z$, $M_X$, $M_Y$) about each axis of the housing 11, 11' of the operation device 1, 1'. The force F ($F_Z$, $F_X$, $F_Y$) in the direction of each axis may be simply referred to as a force F. The moment ($M_Z$, $M_X$, $M_Y$) about each axis may be simply referred to as a moment M.

In regard to the force F in the direction of each axis, the direction of an arrow illustrated in each drawing is defined as a positive direction, and the direction opposite to the arrow is defined as a negative direction. In regard to the moment M about each axis, the clockwise direction as viewed in the direction of the arrow illustrated in each drawing is defined as a positive direction, and the counterclockwise direction as viewed in the direction of the arrow illustrated in each drawing is defined as a negative direction.

Note, here, that "each axis" indicates a Z axis (first axis) which intersects the first main surface 11S1, 11'S1, an X axis (second axis) which is along the first main surface 11S1, 11'S1, and a Y axis (third axis) which is along the first main surface 11S1, 11'S1 and which intersects the X axis.

The strain element 141 a structure which is made of a material having spring properties. A specific configuration of the strain element 141 is not intended to limit the present embodiment, but a Y-shaped strain element can be, for example, used as the strain element 141.

As illustrated in FIG. 5, the strain element 141 having a Y shape includes a core portion 142, a frame portion 143 which surrounds the core portion 142, and arm portions 144a to 144c (only a part of which is illustrated) via which the core portion 142 and the frame portion 143 are coupled to each other.

Strain gauges (not illustrated) are mounted on the respective arm portions 144a to 144c (only a part of which is illustrated). When an external force, which is a force applied from outside the operation device 1, 1', acts on the core portion 142 in a state where the frame portion 143 is fixed, strain which varies depending on the external force occurs in the arm portions 144a to 144c. The strain gauges (not illustrated) detect the external force. The core portion 142 may be referred to as a force receiving portion, and the frame portion 143 may be referred to as a fixing portion.

As the strain element 141, a cross-beam type strain element can be, for example, used instead of the Y-shaped strain element. Note that the Y-shaped strain element has a smaller number of arm portions than the cross-beam type strain element, and thus has the advantage that a small number of strain gauges need to be mounted on the arm portions.

As a material of the strain element 141, any of various materials, such aluminum alloys, alloy tool steels, stainless steels, and ceramics, is generally employed, but the material is not limited thereto. The strain element 141 may be made of, for example, a resin.

In a case where the strain element 141 is made of a resin, it is possible to manufacture the six-axis force-moment sensor 14 at a lower cost than in a case where the strain element 141 is made of a metallic material. In addition, by embedding the strain element 141 into the operation device 1, 1' so that the strain element 141 is integrated with a handle or the like of the operation device 1, 1', it is possible to reduce the weight and the size of the operation device 1, 1'. Therefore, as the six-axis force-moment sensor 14 included in the operation device 1, 1' which is held and operated by a user's hand, a six-axis force-moment sensor which includes a strain element made of a resin can be suitably employed.

The type of the resin used to manufacture the strain element 141 is not particularly limited, and the strain element 141 can be manufactured with use of any resin. Examples of the resin used to manufacture the strain element 141 include polyamide-based resins. The strain element manufactured with use of a polyamide-based resin has the advantages of being excellent in rigidity, bending strength, and the like.

Figure 6:
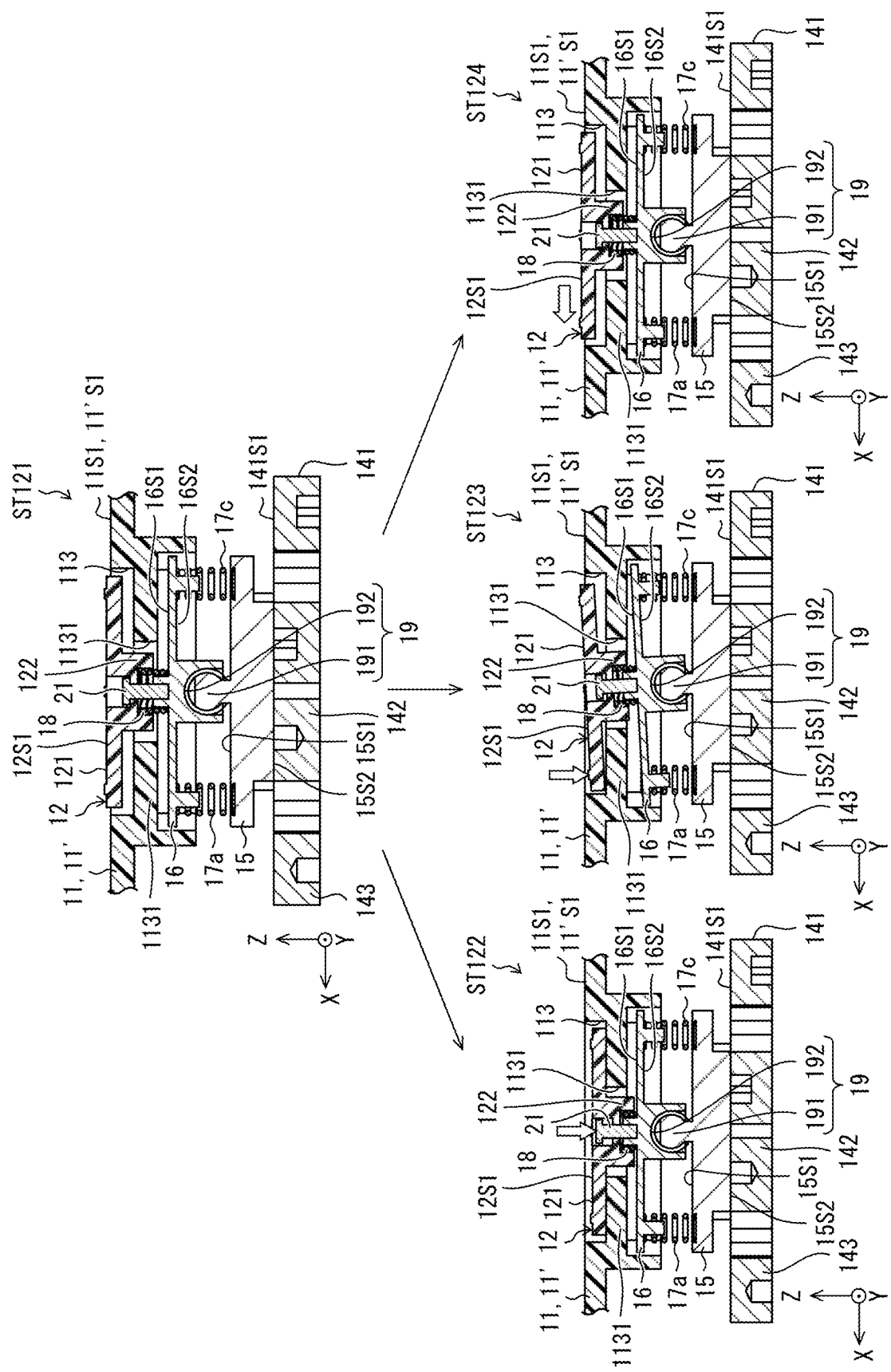
FIG. 6 shows cross-sectional views each of which is for explaining a movement of the button and each of which is taken along a line A-A' illustrated in FIG. 5 and viewed in the direction of arrows illustrated in FIG. 5.

A configuration of the button 12 will be described with reference to FIGS. 5 and 6. As illustrated in FIG. 6, the button 12 has a head portion 121 and a neck portion 122 which has a smaller diameter than the head portion 121. The button 12 is coupled to the strain element 141 such that at least the force $F_Z$ in the direction of the Z axis, the moment $M_X$ about the X axis, and the moment $M_Y$ about the Y axis can act on the strain element 141.

Specifically, as illustrated in FIG. 5, the operation device 1, 1' further includes a first plate 15 and a second plate 16 via which the button 12 and the strain element 141 are coupled to each other, and the button 12 is coupled to the strain element 141 one-to-one. Note that the button 12 and the strain element 141 are coupled to each other via two layers of plates which are the first plate 15 and the second plate 16 disposed in this order from the strain element 141.

Two pairs of first springs (first elastic members) 17a to 17d (only a part of which is illustrated) are provided between the first plate 15 and the second plate 16. A single second spring (second elastic member) 18 is provided between the button 12 and the second plate 16.

A structure (coupled structure) in which the button 12 is coupled to the strain element 141 is described in more detail with reference to FIG. 6. FIG. 6 shows cross-sectional views each of which is for explaining a movement of the button 12 and each of which is taken along a line A-A' illustrated in FIG. 5 and viewed in the direction of arrows illustrated in FIG. 5. A state ST121 illustrated in FIG. 6 is a state of the coupled structure while the user is not applying a load to the button 12.

As illustrated in the drawing of the state ST121 in FIG. 6, in the coupled structure, a second main surface 15S2 of the first plate 15 is coupled to a first main surface 141S1 of the core portion 142 of the strain element 141. Note that, in this specification, out of two main surfaces of each part constituting the coupled structure, a main surface which is located on the positive direction side of the Z axis is referred to as a first main surface, and a main surface which is located on the negative direction side of the Z axis is referred to as a second main surface.

The second plate 16 is coupled to a central portion of the first main surface 15S1 of the first plate 15 via a ball joint 19 such that the second plate 16 can be tilted in any direction with respect to the first main surface 15S1 of the first plate 15.

The ball joint 19 is constituted by a ball portion 191 which is provided in the central portion of the first main surface 15S1 of the first plate 15 and a ball receiving portion 192 which is provided in a central portion of a second main surface 16S2 of the second plate 16.

A joint via which the first plate 15 and the second plate 16 are coupled to each other is not limited to the ball joint 19, which has a spherical shape. Any joint that allows the second plate 16 to be tiltably coupled to the first main surface 15S1 of the first plate 15 can be employed. A joint other than the ball joint 19, which has a spherical shape, may be, for example, a spherical roller mechanism.

The two pairs of the first springs 17a to 17d are provided between the first plate 15 and the second plate 16 such that the two pairs of the first springs 17a to 17d bias the first plate 15 and the second plate 16 in a direction in which the second plate 16 is away from the first main surface 15S1 of the first plate 15.

The first springs 17a and 17c are paired, and the first springs 17b and 17d are paired. In FIG. 6, only the pair of the first springs 17a and 17c, out of the two pairs of the first springs 17a to 17d, are illustrated. The two pairs of the first springs 17a to 17d may be each simply referred to as a first spring 17 without distinction.

It is only necessary that one or more pairs of first springs 17 be provided, and the number of pairs of the first springs 17 is not particularly limited. Further, the type of a spring employed as a first spring 17 is not particularly limited, provided that the spring can exhibit a desired function of biasing the first plate 15 and the second plate 16 in the direction in which the second plate 16 is away from the first main surface 15S1 of the first plate 15.

Examples of the spring which is suitable for use as the first spring 17 include compression coil springs (e.g., cylindrical, barrel, and conical compression coil springs) and leaf springs. From the viewpoint of efficiency transmission of a load applied to the button 12 to the strain element 141, a cylindrical compression coil spring is preferably used. As an example, springs are used as the first elastic members 17a to 17d in the present embodiment. However, elastic bodies other than the springs may be used as the first elastic members 17a to 17d.

Examples of the elastic bodies other than the springs include rubbers. The button 12 is coupled to a central portion of a first main surface 16S1 of the second plate 16 via a screw 21 such that the button 12 can be moved in a direction perpendicular to the first main surface 16S1 of the second plate 16.

The second spring 18 is provided between the button 12 and the second plate 16 such that the second spring 18 biases the button 12 and the second plate 16 in a direction in which the button 12 is away from the first main surface 16S1 of the second plate 16. The type of a spring which can be employed as the second spring 18 is as described above as to the first spring 17.

The second spring 18 is preferably stiffer (e.g., has a higher Young's modulus) than the first spring 17. The reason for this is as follows. In a case where the stiffness (e.g., Young's modulus) of the first spring 17 is greater than that of the second spring 18, the second spring 18 expands and contracts before the first spring 17 when the moment $M_X$ about the X axis or the moment $M_Y$ about the Y axis is applied to the button 12. Therefore, a value of the force $F_Z$ is more likely to be detected than a value of the moment $M_X$ about the X axis or the moment $M_Y$ about the Y axis.

On the other hand, in a case where the stiffness (e.g., Young's modulus) of the second spring 18 is greater than that of the first spring 17, the first spring 17 expands and contracts before the second spring 18 when the moment $M_X$ about the X axis or the moment $M_Y$ about the Y axis is applied to the button 12. As a result, the value of the force $F_Z$ is unlikely to be detected, and the value of the moment $M_X$ about the X axis or the moment $M_Y$ about the Y axis is likely to be detected.

The stiffness (e.g., Young's modulus) of a spring can be measured by a known method. Note that, in each of FIGS. 5 and 6, only a single coupled structure is illustrated. However, the operation device 1 includes another coupled structure. The another coupled structure (not illustrated in FIG. 5) also has the same structure as the coupled structure illustrated in each of FIGS. 5 and 6.

A movement of the button 12 when the user applies a load to the button 12 is described with reference to FIG. 6. A state ST122 illustrated in FIG. 6 is a state of the coupled structure while the user is applying a downward (the direction of an arrow illustrated in FIG. 6) load to a central portion of the button 12.

As illustrated in the state ST122, when the user applies a downward (the direction of the arrow illustrated in FIG. 6) load to the central portion of the button 12, the button 12 is pushed down in the direction perpendicular to the first main surface 16S 1 of the second plate 16. As a result, a force $F_Z-$ in the negative direction of the Z axis, which force $F_Z-$ is an external force directed in the negative direction of the Z axis, acts on the strain element 141, and the six-axis force-moment sensor 14 detects the force $F_Z-$ in the negative direction of the Z axis.

When the user ceases to apply the load to the button 12, the button 12 which is pushed down is returned, by the restoring force of the second spring 18 which is compressed, to a position at which the button 12 has been located before the load is applied to the button 12 (position illustrated in the state ST121).

A degree to which the button 12 is pushed down in the perpendicular direction varies depending on the load applied to the button 12. As a result, a value of the force $F_Z-$ in the negative direction of the Z axis which force $F_Z-$ is detected by the six-axis force-moment sensor 14 varies.

A state ST123 illustrated in FIG. 6 is a state of the coupled structure while the user is applying a downward (the direction of an arrow illustrated in FIG. 6) load to a left portion of the button 12. Note that, in the following description, the front, back, right, and left of the button 12 indicate respective positions on a first main surface 12S 1 of the head portion 121 of the button 12.

Specifically, with reference to coordinate axes illustrated in each of FIGS. 2 to 4, a position on the −Y side, which is the negative direction side of the Y axis as viewed from the center of the first main surface 12S1 of the head portion 121 of the button 12, is defined as a front portion of the button 12, and a position on the +Y side, which is the positive direction side of the Y axis as viewed from the center of the first main surface 12S1 of the head portion 121 of the button 12, is defined as a back portion of the button 12. Similarly, a position on the +X side, which is the positive direction side of the X axis, is defined as a left portion of the button 12, and a position on the −X side, which is the negative direction side of the X axis, is defined as a right portion of the button 12.

As illustrated in the state ST123, when, for example, the user applies a downward (the direction of the arrow illustrated in FIG. 6) load to the left portion of the button 12, the second plate 16 is tilted to the left about the ball portion 191 of the ball joint 19.

As a result, a moment $M_Y+$ about the Y axis and in the positive direction acts on the strain element 141, and the six-axis force-moment sensor 14 detects the moment $M_Y+$ about the Y axis and in the positive direction. When the user ceases to apply the load to the button 12, the second plate 16 is returned, by the restoring force of the first spring 17a which is compressed, to a position at which the second plate 16 has been located before the load is applied to the button 12 (position illustrated in the state ST121).

Similarly, when the user applies a downward (the direction of the arrow illustrated in FIG. 6) load to the right portion, the front portion, or the back portion of the button 12, the second plate 16 is tilted to the right, the front, or the back about the ball portion 191 of the ball joint 19, depending on a position to which the load is applied.

As a result, a moment $M_Y-$ about the Y axis and in the negative direction, a moment $M_X+$ about the X axis and in the positive direction, or a moment $M_X-$ about the X axis and in the negative direction acts on the strain element 141. The six-axis force-moment sensor 14 detects the moment $M_Y-$ about the Y axis and in the negative direction, the moment $M_X+$ about the X axis and in the positive direction, or the moment $M_X-$ about the X axis and in the negative direction.

A degree to which the second plate 16 is tilted varies depending on the load applied to the button 12. As a result, a value of the moment $M_Y+$ about the Y axis and in the positive direction, the moment $M_Y-$ about the Y axis and in the negative direction, the moment $M_X+$ about the X axis and in the positive direction, or the moment $M_X-$ about the X axis and in the negative direction, which moment is detected by the six-axis force-moment sensor 14, varies.

The second plate 16 is tiltably coupled to the first plate via the ball joint 19. Therefore, the second plate 16 can be tilted in any direction on an XY plane about the ball portion 191 of the ball joint 19, depending on a position on the button 12 to which position a load is applied.

The second plate 16 is tiltably coupled to the first plate via the ball joint 19. Therefore, not only the moment $M_Y+$ about the Y axis and in the positive direction, the moment $M_Y-$ about the Y axis and in the negative direction, the moment $M_X+$ about the X axis and in the positive direction, and the moment $M_X-$ about the X axis and in the negative direction but also a moment about any axis on the XY plane can be caused to act on the strain element 141. Note that any axis on the XY plane indicates any composite component of an X-axis component and a Y-axis component.

As a result, it is possible for the six-axis force-moment sensor 14 to detect not only the moment $M_Y+$ about the Y axis and in the positive direction, the moment $M_Y-$ about the Y axis and in the negative direction, the moment $M_X+$ about the X axis and in the positive direction, and the moment $M_X-$ about the X axis and in the negative direction but also the moment about any axis on the XY plane.

The button 12 can be configured such that the six-axis force-moment sensor 14 can detect a force $F_X$ in the direction of the X axis, a force $F_Y$ in the direction of the Y axis, and a force in any direction on the XY plane in addition to the foregoing force $F_Z$ in the direction of the Z axis, the moment $M_X$ about the X axis, the moment $M_Y$ about the Y axis, and the moment about any axis on the XY plane. A state ST124 illustrated in FIG. 6 is a state of the coupled structure while the user is applying, to the button 12, a force in the positive direction +X of the X axis (the direction of an arrow illustrated in FIG. 6).

As illustrated in the state ST124, when, for example, the user applies a load to the button 12 so that the button 12 is slid in the positive direction of the X axis (the direction of the arrow illustrated in FIG. 6), the second plate 16 is moved to the left relative to the strain element 141.

As a result, a force $F_X+$ in the positive direction of the X axis acts on the strain element 141, and the six-axis force-moment sensor 14 detects the force $F_X+$ in the positive direction of the X axis. When the user ceases to apply the load to the button 12, the second plate 16 is returned, by the weight of the second plate 16 itself and the restoring force of the first spring 17, to the position at which the second plate 16 has been located before the load is applied to the button 12 (position illustrated in the state ST121).

Similarly, when the user applies a load to the button 12 so that the button 12 is slid in the negative direction −X of the X axis, the positive direction +Y of the Y axis, the positive direction +X of the X axis, or any direction on the XY plane, the second plate 16 is moved in a horizontal direction relative to the strain element 141, depending on a direction in which the load is applied.

In a case where the second plate 16 is tilted to the right, the front, or the back about the ball portion 191 of the ball joint 19, a force $F_X-$ in the negative direction of the X axis, a force $F_Y+$ in the positive direction of the Y axis, a force $F_Y-$ in the negative direction of the Y axis, or a force in any direction on the XY plane acts on the strain element 141. As a result, the six-axis force-moment sensor 14 detects the force $F_X-$ in the negative direction of the X axis, the force $F_Y+$ in the positive direction of the Y axis, the force $F_Y-$ in the negative direction of the Y axis, or the force in any direction on the XY plane.

A degree to which the second plate 16 is moved in the horizontal direction varies depending on the load applied to the button 12. As a result, a value of the force $F_X+$ in the positive direction of the X axis, the force $F_X-$ in the negative direction of the X axis, the force $F_Y+$ in the positive direction of the Y axis, the force $F_Y-$ in the negative direction of the Y axis, or the force in any direction on the XY plane, which force is detected by the six-axis force-moment sensor 14, varies.

As has been described, the button 12 can have two functions of, for example, a conventional cross key and a conventional analog stick. Specifically, it is possible to carry out inputs in eight directions including not only the positive direction +X of the X axis, the negative direction −X of the X axis, the positive direction +Y of the Y axis, and the negative direction −Y of the Y axis as in the conventional cross key, but also oblique directions. Furthermore, the button 12 can also be moved 360°, as in the conventional analog stick.

Moreover, the height of the button 12 is low in the direction of the Z axis, as in the conventional cross key. Thus, the button 12 is suitable to reduce the height of the operation device 1, 1'. In addition, the button 12 makes it possible for the six-axis force-moment sensor 14 to detect the force $F_Z$ in the direction of the Z axis, the force in any direction on the XY plane, and the moment about any axis on the XY plane.

As illustrated in FIG. 6, a depressed portion 113 in which the head portion 121 of the button 12 is accommodated is preferably provided to the first main surface 11S1, 11'S1 of the housing 11, 11' of the operation device 1, 1'. The depressed portion 113 preferably has, in a bottom surface thereof, a button opening 1131 through which the neck portion 122 of the button 12 passes through.

Since the first main surface 11S1, 11'S1 of the housing 11, 11' has the depressed portion 113 having the above configuration, it is possible to accommodate the head portion 121 of the button 12 in the depressed portion 113. As a result, since the button 12 does not project from the first main surface 11S1, 11'S1 of the housing 11, 11', it is possible to make a surface of the operation device 1, 1' flat.

The button opening 1131 formed in the bottom surface of the depressed portion 113 has a smaller diameter than the head portion 121 of the button 12. This limits, in a certain case, a range of a tilt of the second plate 16 with respect to the first main surface 15S1 of the first plate 15. Therefore, it is possible to prevent the six-axis force-moment sensor 14 from being overloaded, in a case where a certain amount or more of load is applied to the button 12.

Note that the certain case is, for example, a case where the force $F_Y+$ is applied to the button 12 and the moment $M_X$ about the X axis or the moment $M_Y$ about the Y axis is applied to the button 12. Note also that, specifically, the force $F_Y+$ is, for example, a force which is mainly applied to a range of a movement of the button 12 in the direction perpendicular to the first main surface 16S1 of the second plate 16.

Figure 7:
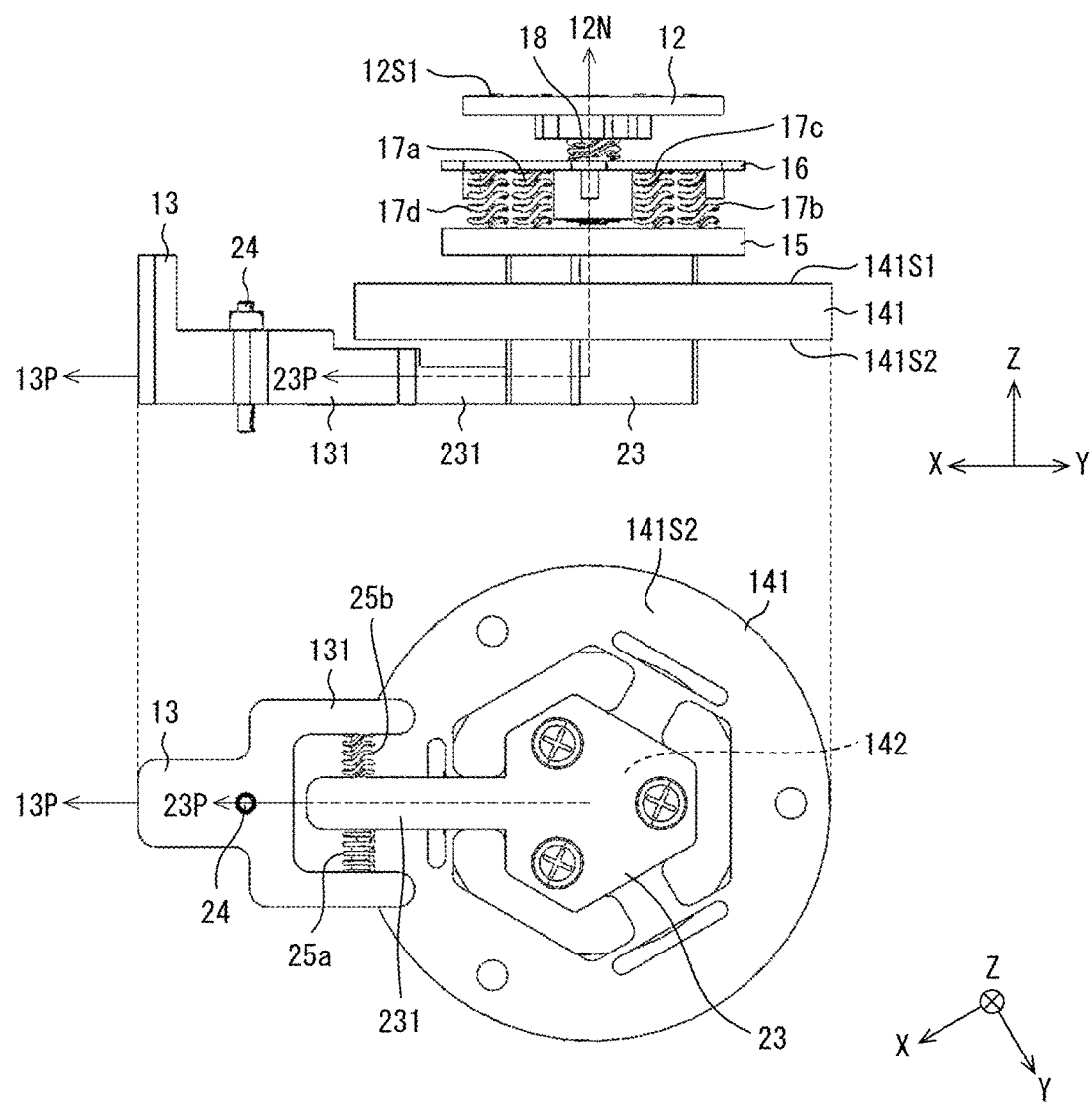
FIG. 7 shows a side view and a bottom view each illustrating a structure in which a lever and the strain element that are included in the operation device are coupled to each other.

A configuration of the lever 13 is described with reference to FIGS. 7 and 8. FIG. 7 shows a side view and a bottom view each illustrating a structure (coupled structure) in which the lever 13 and the strain element 141 that are included in the operation device 1, 1' are coupled to each other.

The lever 13 includes an arm portion 131 which is provided to an end portion thereof that is located inside the housing 11, 11' and which has a pair of arms, and is fixed to the housing 11, 11' of the operation device 1, 1' via a rotation shaft 24. Thus, the lever 13 is rotatable about the rotation shaft 24.

The lever 13 is coupled to the strain element 141 such that the moment $M_Z$ about the Z axis can act on the strain element 141. Specifically, a third plate 23 having a projecting portion 231 is coupled to the strain element 141. Note that the third plate 23 is coupled to a second main surface 141S2 of the core portion 142 of the strain element 141.

The projecting portion 231 of the third plate 23 projects from an outer circumferential end surface of the third plate 23 toward a gap between the pair of the arms of the arm portion 131 of the lever 13. The arm portion 131 of the lever 13 and the projecting portion 231 of the third plate 23 are coupled to each other via a pair of third springs (third elastic member) 25a and 25b. The pair of the third springs 25a and 25b may be each simply referred to as a third spring without distinction.

The type of a spring which can be employed as the third spring 25 is as described above as to the first spring 17. By coupling the lever 13 to the strain element 141 in the above-described orientation, it is possible to provide the lever 13 to the side surface 11S3, 11'S3 (FIGS. 2 to 4) of the housing 11, 11' of the operation device 1, 1'.

As illustrated in FIG. 7, the direction 23P of projection of the projecting portion 231 of the third plate 23 is, for example, perpendicular to the direction 12N of a line normal to the first main surface 12S1 of the button 12. The lever 13 protrudes in a direction (direction 13P) along the direction 23P, and is coupled to the projecting portion 231 such that the projecting portion 231 of the third plate 23 can be rotated in the circumferential direction of the Z axis.

Since the direction 12N and the direction 23P are perpendicular to each other, it is possible to, in the operation device 1, 1', maximally use information as to the six axes (the forces $F_Z$, $F_X$, and $F_Y$ and the moments $M_Z$, $M_X$, and $M_Y$) which information can be detected by the six-axis force-moment sensor 14.

Note that, in FIG. 7, only a single coupled structure is illustrated. However, the operation device 1, 1' includes another coupled structure. The another coupled structure (not illustrated in FIG. 7) also has the same structure as the coupled structure illustrated in FIG. 7.

A movement of the lever 13 when the user applies a load to the lever 13 is described with reference to FIG. 8. FIG. 8 shows bottom views each for explaining a movement of the lever 13. A state ST131 illustrated in FIG. 8 is a state of the coupled structure while the user is not applying a load to the lever 13. A state ST132 illustrated in FIG. 8 is a state of the coupled structure while the user is applying a load to the lever 13 in the direction of an arrow illustrated in FIG. 8.

Figure 8:
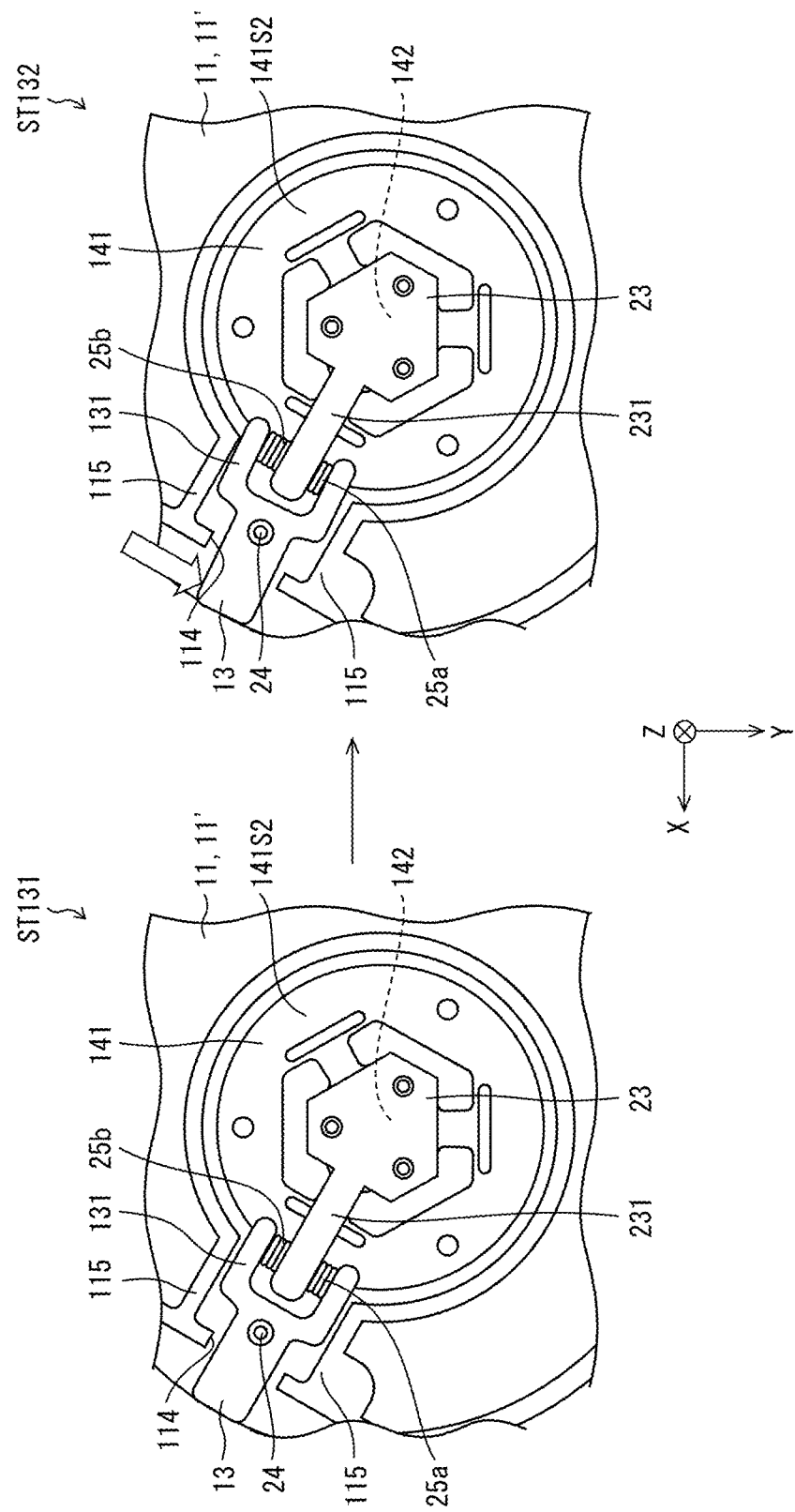
FIG. 8 shows bottom views each for explaining a movement of the lever.

As illustrated in the state ST132, when, for example, the user applies a load to the lever 13 in the direction of the arrow illustrated in FIG. 8, the lever 13 is rotated counterclockwise in FIG. 8 about the rotation shaft 24. As a result, the arm portion 131 acts on the projecting portion 231 of the third plate 23, so that a moment $M_Z$– about the Z axis and in the negative direction acts on the strain element 141, and the six-axis force-moment sensor 14 detects the moment $M_Z$– about the Z axis and in the negative direction. When the user ceases to apply the load to the lever 13, the lever 13 is returned, by the restoring force of the third spring 25a which is compressed, to a position at which the lever 13 has been located before the load is applied to the lever 13 (position illustrated in the state ST131).

Similarly, when the user applies a load to the lever 13 in the direction opposite to the arrow illustrated in FIG. 8, the lever 13 is rotated clockwise in FIG. 8 about the rotation shaft 24. As a result, the arm portion 131 acts on the projecting portion 231 of the third plate 23, so that a moment $M_Z$+ about the Z axis and in the positive direction acts on the strain element 141, and the six-axis force-moment sensor 14 detects the moment $M_Z$+ about the Z axis and in the positive direction.

A degree to which the lever 13 is rotated varies depending on the load applied to the lever 13. As a result, a value of the moment $M_Z$– about the Z axis and in the negative direction or the moment $M_Z$+ about the Z axis and in the positive direction which moment $M_Z$– or $M_Z$+ is detected by the six-axis force-moment sensor 14 varies.

Preferably, a lever opening 114 through which the lever 13 passes through is provided to the side surface 11S3, 11'S3 (FIGS. 2 to 4) of the housing 11, 11' of the operation device 1, 1'. Preferably, a wall (raised portion) 115 which is raised in a direction that intersects the first main surface 11S1, 11'S1 of the housing 11, 11' is provided to an inner surface of the housing 11, 11' such that the wall 115 is located on both outer sides of the arm portion 131.

Since the lever opening 114 is provided to the side surface 11S3, 11'S3 (FIGS. 2 to 4) of the housing 11, 11' of the operation device 1, 1', it is possible to expose the lever 13 from the lever opening 114.

Further, since the wall 115 is provided to the inner surface of the housing 11, 11' such that the wall 115 is located on both the outer sides of the arm portion 131, it is possible to prevent the six-axis force-moment sensor 14 from being overloaded, in a case where a certain amount or more of load is applied to the lever 13.

As described above, since the operation device 1, 1' includes the lever 13, the six-axis force-moment sensor 14 can detect, via the lever 13, the moment $M_Z$ about the Z axis. By rotating the lever 13 on the XY plane, it is easy to cause the moment $M_Z$ about the Z axis to act on the strain element 141. As a result, the operability of the operation device 1, 1' is improved, as compared with a case where an operation of twisting the lever 13 is conducted and consequently the moment $M_Z$ about the Z axis is detected.

Moreover, the six-axis force-moment sensor 14 detects, via the lever 13, the moment $M_Z$ about the Z axis, so that an operation of twisting for causing the moment $M_Z$ about the Z axis to act on the strain element 141 can be made independent of an operation of pushing or tilting the button 12.

As a result, since it is possible to simultaneously make a detection of the force $F_Z$ in the direction of the Z axis, the force $F_X$ in the direction of the X axis, the force $F_Y$ in the direction of the Y axis, the moment $M_X$ about the X axis, or the moment $M_Y$ about the Y axis and a detection of the moment $M_Z$ about the Z axis, the variety of operations of the operation device 1, 1' is improved.

Moreover, it is possible for the user to three-dimensionally apply the force F and the moment M to the button 12 and the lever 13 of the operation device 1, 1'. The directions and the strengths of the force F and the moment M are detected by the six-axis force-moment sensor 14. Therefore, it is possible for the user to carry out more various operations with respect to the operation target 2 (FIG. 1).

As a result, it is possible to cause the motion control target, such as the character 31 (FIG. 1), depicted in the operation target 2 (FIG. 1) to make more various motions. Furthermore, according to the operation device 1, 1', since it is possible to detect the level of a force (e.g., the force $F_Z$ in the direction of the Z axis, the moment $M_X$ about the X axis, the moment $M_Y$ about the Y axis, and the moment $M_Z$ about the Z axis), it is possible to change the speed of a motion of the motion control target depicted in the operation target 2 (FIG. 1).

Figure 9:
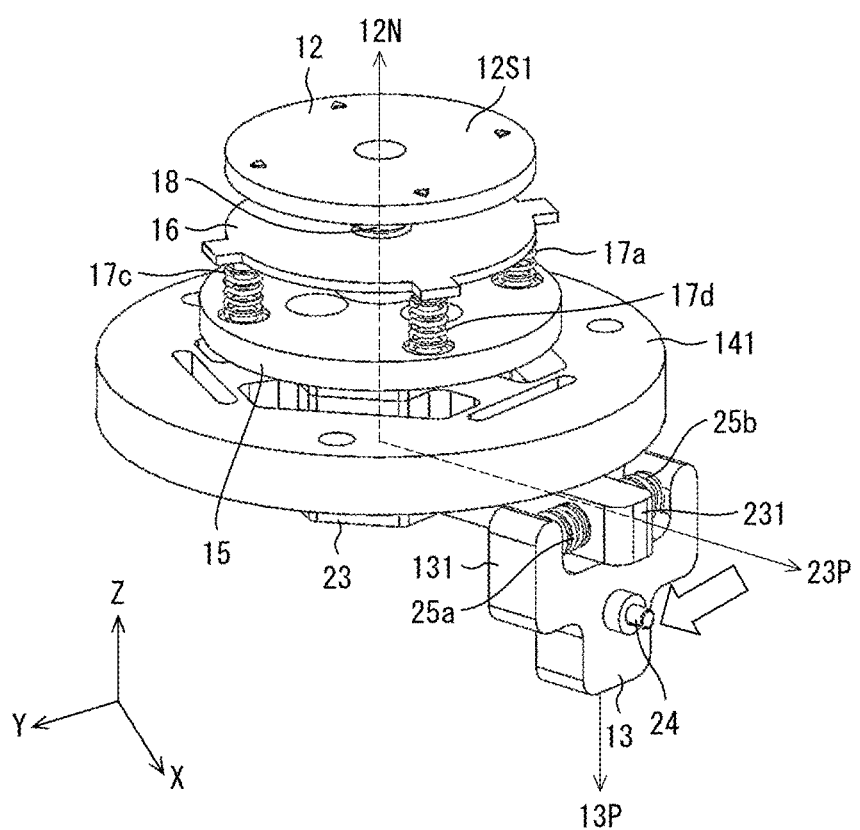
FIG. 9 is a perspective view for explaining a variation and a movement of the lever.

The motion of the motion control target, the motion of which is controlled by operation device 1, 1', may be assisted by the motion control target assisting part. Further, not a single motion control target but a plurality of motion control targets may be depicted. Note that, for example, the motion control target assisting part is controlled by the operation device 1, 1'. Note that the control operation target 2 (FIG. 1) may be controlled, by the operation device 1, 1', to be turned off. Note also that the lever 13 may be alternatively disposed on the surface (second main surface 11S2, 11'S2 (FIGS. 2 to 4)) at the rear of the first main surface 11S1, 11'S1 (FIGS. 2 to 4), as illustrated in FIG. 9.

Figure 10:
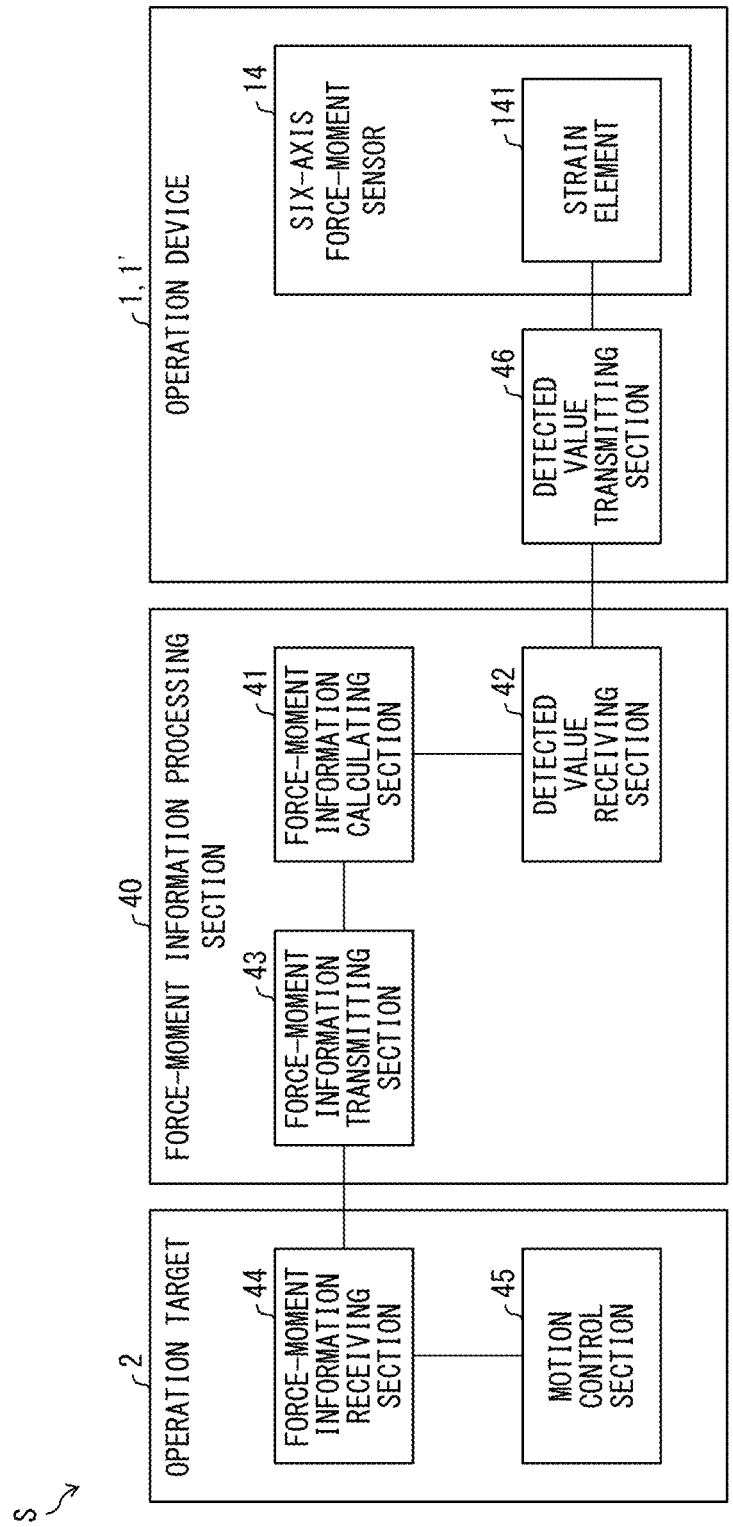
FIG. 10 is a block diagram illustrating configurations of main parts of the operation device, the operation target, and the like in accordance with an embodiment of the present invention.
Figure 11:
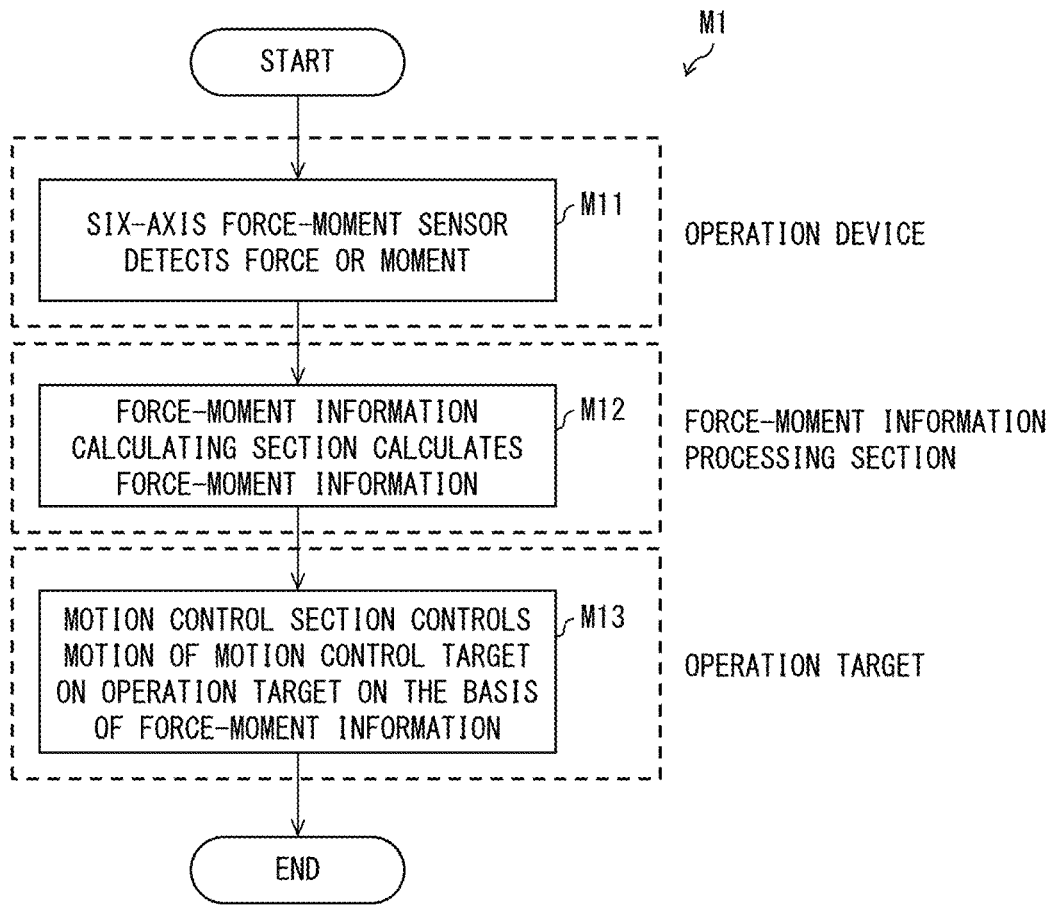
FIG. 11 is a flowchart for explaining an example of a procedure of a motion control process in accordance with an embodiment of the present invention.

A flow of information between the operation device 1, 1' and the operation target 2 will be described with reference to FIGS. 10 and 11. An operation system S includes, for example, (i) the operation device 1, 1' which includes at least one six-axis force-moment sensor 14 and (ii) the operation target 2. Force-moment information HI is information for indicating a motion of the motion control target, and is based on at least one of the force F and the moment M. Note that a force-moment information processing section 40 may be included in the operation device 1, 1'.

For example, a force-moment information calculating section 41, a detected value receiving section 42, a force-moment information transmitting section 43, a force-moment information receiving section 44, and a motion control section 45 are implemented in the operation device 1, 1' or the operation target 2 by an integrated circuit or the like.

Note that the force-moment information calculating section 41, the detected value receiving section 42, the force-moment information transmitting section 43, the force-moment information receiving section 44, and the motion control section 45 may be each a program which is stored in a storage section (not illustrated), such as a random access memory (RAM), included in the operation device 1, 1' or the operation target 2, and be executed by an executing section (not illustrated), such as a central processing unit (CPU), included in the operation device 1, 1' or the operation target 2.

The flow of the information between the operation device 1, 1' and the operation target 2 according to the present embodiment is described with reference to FIG. 11, which is a flowchart for explaining an example of a procedure of a motion control process M1.

The operation device 1, 1' outputs, via a detected value transmitting section 46, a signal which varies depending on values of the force F and the moment M that have been detected by the strain element 141 (step M11). The force-moment information processing section 40 (i) receives, by the detected value receiving section 42, the signal which varies depending on the values of the force F and the moment M that have been detected, (ii) calculates, by the force-moment information calculating section 41, the force-moment information HI on the basis of the signal which varies depending on the values, and then (iii) transmits, by the force-moment information transmitting section 43, the force-moment information HI thus calculated (step M12).

The operation target 2 receives, by the force-moment information receiving section 44, the force-moment information HI, and controls, by the motion control section 45, a motion of the character 31 (FIG. 1) so that a content of an operation is carried out on the basis of the force-moment information HI (step M13).

Figure 12:
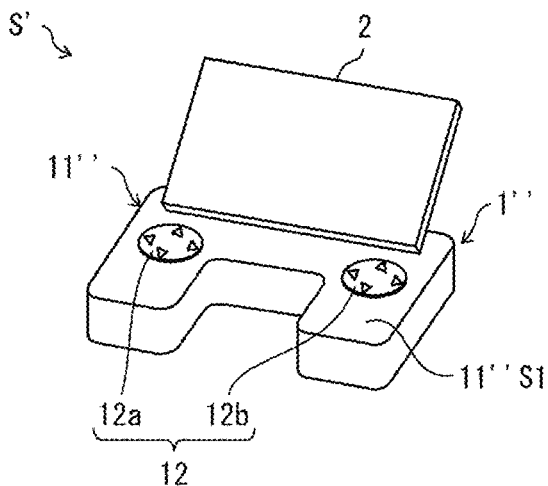
FIG. 12 is a perspective view illustrating a variation of an operation system.

Note that the operation system S may be an integrated system in which an operation device 1" is integrated with the operation target 2 as illustrated in FIG. 12, and may include a grip part (not illustrated) that is easy for the user to hold.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1, 1', 1" Operation device, 2 Operation target, 11, 11', 11" Housing, 12, 12a, 12b Button, 13, 13a, 13b Lever, 14, 14a, 14b Six-axis force-moment sensor, 15 First plate, 16 Second plate, 17, 17a, 17b, 17c, 17d First spring (first elastic member), 18 Second spring (second elastic member), 23 Third plate, 24 Rotation shaft, S, S' Operation system, 25, 25a, 25b Third spring (third elastic member)

The invention claimed is:

1. An operation device comprising:
at least one six-axis force-moment sensor;
a button;
a first plate; and
a second plate,
the at least one six-axis force-moment sensor being capable of detecting (i) a force in a direction of a first axis which intersects a first main surface of a housing, (ii) a moment about the first axis, (iii) a force in a direction of a second axis which is along the first main surface of the housing, (iv) a moment about the second axis, (v) a force in a direction of a third axis which is along the first main surface of the housing and which intersects the second axis, and (vi) a moment about the third axis,
the button being capable of detecting at least the force in the direction of the first axis, the moment about the second axis, and the moment about the third axis, and being provided to the first main surface of the housing,
the button and a strain element which is included in the at least one six-axis force sensor being coupled to each other via the first plate and the second plate,
a second main surface of the first plate being coupled to a first main surface of the strain element,
a second main surface of the second plate being coupled to a central portion of a first main surface of the first plate such that the second main surface of the second plate can be tilted with respect to the first main surface of the first plate,
the button being coupled to a central portion of a first main surface of the second plate such that the button can be moved in a direction perpendicular to the first main surface of the second plate,
at least one pair of first elastic members being provided between the first plate and the second plate such that the at least one pair of the first elastic members bias the first plate and the second plate in a direction in which the second plate is away from the first main surface of the first plate,
a second elastic member being provided between the button and the second plate such that the second elastic member biases the button and the second plate in a direction in which the button is away from the first main surface of the second plate.

2. The operation device as set forth in claim 1, wherein the second elastic member has a higher Young's modulus than the at least one pair of the first elastic members.

3. The operation device as set forth in claim 1, wherein:
the button has a head portion and a neck portion which has a smaller diameter than the head portion; and
a depressed portion in which the head portion is accommodated and which has, in a bottom surface of the depressed portion, a button opening through which the neck portion passes is provided to the first main surface of the housing.

4. An operation device comprising:
at least one six-axis force-moment sensor;
a button; and
a lever, the at least one six-axis force-movement sensor being capable of detecting (i) a force in a direction of a first axis which intersects a first main surface of a housing, (ii) a moment about the first axis, (iii) a force in a direction of a second axis which is along the first main surface of the housing, (iv) a moment about the second axis, (v) a force in a direction of a third axis which is along the first main surface of the housing and which intersects the second axis, and (vi) a moment about the third axis,
the button being capable of detecting at least the force in the direction of the first axis, the moment about the second axis, and the moment about the third axis, and being provided to the first main surface of the housing,
the lever being provided to a side surface or a second main surface of the housing and being capable of detecting the moment about the first axis, the lever including an arm portion which is provided to an end portion of the lever that is located inside the housing and which has a pair of arms, and being fixed to the housing via a rotation shaft,
a third plate which has a projecting portion being coupled to a strain element which is included in the at least one six-axis force-moment sensor,
the projecting portion projecting from an outer circumferential end surface of the third plate toward a gap between the pair of the arms of the arm portion,
the arm portion of the lever and the projecting portion being coupled to each other via a third elastic member.

5. The operation device as set forth in claim 4, wherein:
a lever opening through which the lever passes is provided to the side surface or the second main surface of the housing; and
a raised portion which is raised in a direction that intersects the first main surface of the housing is provided to an inner surface of the housing such that the raised portion is located on both outer sides of the arm portion.

6. An operation system comprising:
the operation device recited in claim 4;
a force-moment information processing section which calculates force-moment information on the basis of the forces and the moments that have been detected by the at least one six-axis force-moment sensor; and
an operation target which controls a motion of a motion control target on the basis of the force-moment information.

\* \* \* \* \*